United States Patent
Kolder et al.

(10) Patent No.: US 9,297,404 B2
(45) Date of Patent: Mar. 29, 2016

(54) SINGLE TOOL INSTALLATION/REMOVAL OF RESTRAINT CABLE WITH ANTI-ROTATION FEATURE

(71) Applicant: HONEYWELL INTERNATIONAL INC., Morristown, NJ (US)

(72) Inventors: Mark Edmund Kolder, Torrance, CA (US); Eric L. Helquist, Redondo Beach, CA (US); Mark Fewell, Riverside, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 188 days.

(21) Appl. No.: 14/198,197

(22) Filed: Mar. 5, 2014

(65) Prior Publication Data
US 2014/0175791 A1    Jun. 26, 2014

Related U.S. Application Data

(63) Continuation-in-part of application No. 13/310,430, filed on Dec. 2, 2011, now abandoned.

(51) Int. Cl.
*F16B 39/00* (2006.01)
*F16B 39/10* (2006.01)
(Continued)

(52) U.S. Cl.
CPC ............. *F16B 39/00* (2013.01); *F16B 39/10* (2013.01); *F16B 39/28* (2013.01); *F16L 23/02* (2013.01); *F16L 23/036* (2013.01); *F16L 25/12* (2013.01); *F16L 27/1012* (2013.01); *H02G 3/06* (2013.01); *Y10T 29/49963* (2015.01)

(58) Field of Classification Search
CPC .......... F16B 39/10; F16B 39/20; F16B 39/28; F16B 39/30; F16L 23/02; F16L 23/036; F16L 27/1012; F16L 25/12; F16L 49/02; F16L 47/14; Y10T 29/49963; Y10T 29/49947; Y10T 29/49948
See application file for complete search history.

(56) References Cited

U.S. PATENT DOCUMENTS 3,084,957 A * 4/1963 Caldwell ............... F16L 27/111
                                                        285/114
4,204,707 A * 5/1980 Lincicome ............ F16L 27/111
                                                        138/121
(Continued)

FOREIGN PATENT DOCUMENTS

DE     102005052419 A1    8/2006
GB           04560 A      0/1910

OTHER PUBLICATIONS

European Search Report in EP Application No. EP12194454 dated Jan. 17, 2014.

*Primary Examiner* — Jason L Vaughan
(74) *Attorney, Agent, or Firm* — Shimokaji IP (57) ABSTRACT

An anti-rotation duct restraint system and methods of using this system for connecting flexible ducts are described. The anti-rotation duct restraint system includes a flexible cable having a swaged cable end and a flattened threaded cable end, wherein the swaged cable end can be aligned with a though-hole in a first flange of a first flexible duct, and the flattened threaded cable end, along with a mating metal bushing, can be aligned with a through-hole in a second flange of a second flexible duct. The system also includes a nut, which can be threaded onto the flattened threaded cable end and secured using a single tool with one hand, for connecting the first flexible duct with the second flexible duct.

6 Claims, 8 Drawing Sheets

(51) Int. Cl.
*F16B 39/28* (2006.01)
*F16L 23/02* (2006.01)
*F16L 23/036* (2006.01)
*F16L 25/12* (2006.01)
*F16L 27/10* (2006.01)
*H02G 3/06* (2006.01)

(56) References Cited

U.S. PATENT DOCUMENTS

| | | | |
|---|---|---|---|
| 4,629,272 A | 12/1986 | Mattingly et al. | |
| 5,273,321 A * | 12/1993 | Richter | F16L 51/024 285/114 |
| 6,086,400 A | 7/2000 | Fowler | |
| 6,168,210 B1 * | 1/2001 | Bird | F16L 21/04 285/337 |
| 6,525,991 B2 | 2/2003 | Greiger | |
| 6,837,523 B2 * | 1/2005 | Surjaatmadja | F16L 57/00 285/1 |
| 8,662,540 B2 * | 3/2014 | Whitener | F16L 21/08 285/320 |
| 2011/0181041 A1 | 7/2011 | Argersinger | |
| 2013/0142569 A1 | 6/2013 | Kolder et al. | |
| 2013/0202381 A1 * | 8/2013 | Frenken | F16B 37/085 411/267 |

* cited by examiner

SINGLE TOOL INSTALLATION/REMOVAL OF RESTRAINT CABLE WITH ANTI-ROTATION FEATURE

CROSS REFERENCE TO RELATED APPLICATIONS

This application is a continuation-in-part of, and claims priority benefit under 35 U.S.C. §120 to U.S. patent application Ser. No. 13/310,430, filed Dec. 2, 2011, titled "ANTI-ROTATION CABLE RESTRAINT FOR CONNECTING FLEXIBLE DUCTS," the entire disclosure of which is hereby incorporated by reference.

TECHNICAL FIELD

The present invention generally relates to devices, systems, and methods for connecting flexible ducts to each other, and in particular, relates an anti-rotation duct restraint device and system thereof, and methods for using the anti-rotation duct restraint device for connecting ducts with a single tool.

BACKGROUND AND SUMMARY

Ducts are commonly used in aircraft, houses and vehicles for heating, ventilating, and cooling by the conveyance, delivery and removal of air. Air ducts are designed for the efficient delivery of air and to ensure acceptable indoor air quality as well as thermal comfort. Ducts can be made out of a variety of materials including metals and fiberglass, but are typically made from galvanized steel or aluminum sheet metal. The standard and most commonly used material in fabricating ductwork is galvanized steel. For insulation purposes, metal ducts can be lined with a fiberglass duct-liner or wrapped externally with a fiberglass blanket. Typically, sheet metal ducts are installed first, and then covered with insulation.

Commercial aircraft have air duct network systems for heating and air conditioning, which convey air to the passenger cabin and the cockpit. A central air supply system can be controlled from the cockpit, which serves to constantly supply fresh air to the passengers and crew. The fresh air can be taken from the aircraft power unit as the so called bleed air, and routed into the interior of the aircraft through a series of ducts and air inlet openings. The bleed air is drawn from the compressor stages of a turbine engine and conducted through the duct network at temperatures of up to 957° F. and pressures of up to 312 psi. The hot fresh air can be cooled and dehumidified and distributed to the various parts of the plane for the comfort of the passengers and crew. Bleed air may also be used for cabin pressurization and wing de-icing.

The construction of ductwork starts by measuring the distance and angles to suit the installation. Ducts can be customized for special shapes either on site or in the shop. The duct parts can be cut or bent if required to obtain different fittings, e.g. elbows and tapers. For the final assembly, the ducts can be connected or bolted together through a series of connectors. The use of connectors, however, may require a large working area for their installation and may result in a rigid ductwork structure. This is not particularly desirable in aircrafts where ease of installation and motion absorption are important.

It would therefore be helpful to provide new devices, systems, and methods for connecting flexible ducts, particularly an anti-rotation duct restraint device and system, and methods for using the device and system for installing, connecting and removing ducts with single hand using a single tool. Accordingly, in one aspect of the invention an anti-rotation duct restraint for connecting flexible ducts includes a flexible cable; a swaged cable end coupled to the cable along an axis of the cable; and a flattened threaded cable end coupled to the cable along the axis of the cable.

In another embodiment of the invention, an anti-rotation duct restraint system for connecting flexible ducts includes a flexible cable; a swaged cable end coupled to the cable along an axis of the cable; a flattened threaded cable end coupled to the cable along the axis of the cable; a washer, wherein the washer fits between the swaged cable end and a first flange of a first flexible duct; a mating metal bushing, wherein the mating metal bushing is adapted to fit over flattened threaded cable end, and wherein the flattened threaded cable end and mating metal bushing, together, fit into a second flange of a second flexible duct; and a nut, wherein the nut can be threaded onto the flattened threaded cable end for connecting the first flexible duct with the second flexible duct.

In yet another embodiment of the invention, a method for connecting flexible ducts using an anti-rotation duct restraint system includes preparing a flexible cable having a swaged cable end coupled to the cable along an axis of the cable, and a flattened threaded cable end coupled to the cable along the axis of the cable; aligning the swaged cable end with a through-hole in a first flange of a first flexible duct, and a washer, wherein the washer fits between the swaged cable end and the first flange of a first flexible duct; aligning the flattened threaded cable end and a mating metal bushing with a through-hole in a second flange of a second flexible duct, wherein the mating metal bushing is adapted to fit over flattened threaded cable end, and wherein the flattened threaded cable end and mating metal bushing, together, fit into the second flange of the second flexible duct; and securing the flattened threaded cable end to the second flange of the second flexible duct using a nut.

These and other features, aspects and advantages of the present invention will become better understood with reference to the following drawings, description and claims.

DETAILED DESCRIPTION

The following detailed description illustrates one or more possible modes of carrying out exemplary embodiments of the invention.

The description is not to be taken in a limiting sense, but is made merely for the purpose of illustrating general principles and enabling various ways of making and practicing of the invention, since the scope of the invention is defined by the appended claims.

Various inventive features are described below that may each be used independently of one another or in combination with other features.

Broadly, embodiments described below generally relate to one or more ways to connect duct segments using one or more cable restraints. The cable restraints of one or more of the embodiments may be configured to be anti-rotation such that the restraint does not rotate when coupled to a duct flange. In this manner, the cable restraints may be attached to (or detached from) the duct flange using a single tool (and/or a single hand or other manipulation apparatus).

Figure 1:
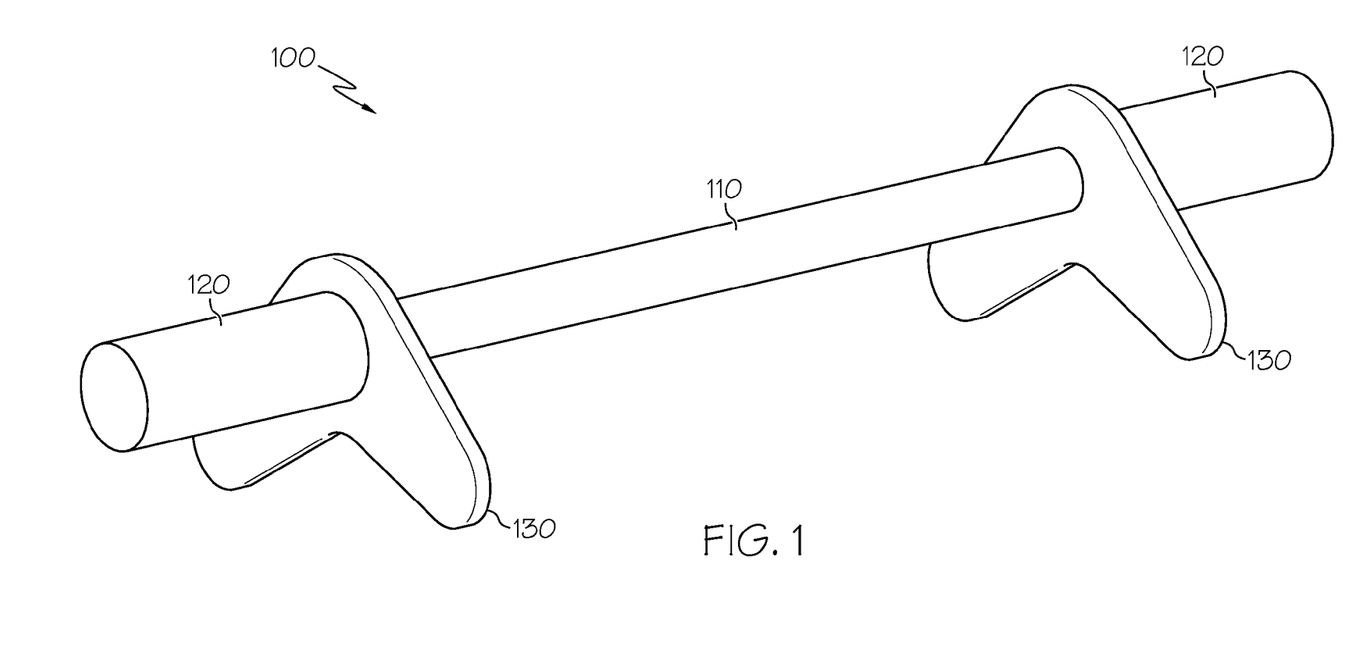
FIG. 1 illustrates a perspective view of an anti-rotation cable restraint according to an exemplary embodiment of the present invention.

FIG. 1 illustrates a perspective view of an anti-rotation cable restraint according to an exemplary embodiment. Specifically, this figure shows the various components of the cable restraint 100, which may include a cable 110, two threaded ends (or "fittings") 120, and two anti-rotation cams 130. The cable 110 may be an appropriate length of a metal shaft or a flexible wire rope of an appropriate diameter for the duct segments to be connected. The cable 110 extends through threaded end 120 and may provide a male component for coupling with a threaded end fitting. The threaded ends may be cylindrical pieces of metal of an appropriate diameter. The fitting 120 may include wrench flats at the interior end and an external screw thread at the exterior end of the fitting. The interior wrench flats and exterior thread with nut may be used to secure the cable restraint 100 to each flange of the ducts. The wrench flats refers to the flats on the surface of the flange facing the other duct, while the "exterior" nut refers to the nut on the surface of the flange facing away from the other duct. The interior wrench flats may be positioned such that the spacing between the cables is maintained at an appropriate distance. The exterior nut may then be tightened while the interior wrench flats are prevented from rotating. When decoupling the cables, the interior wrench flats may be prevented from rotating while the exterior nut is loosened. A technician may typically complete the task of connecting or disconnecting the ducts with one hand and one tool, allowing easier access to the confined spaces in which the ducts may be connected. In addition, the cable restraint 100 automatically sets the proper gap between the two duct flanges without the need for any measurement, gage, and/or jig or other device to maintain the appropriate spacing between the duct flanges.

In one embodiment, an anti-rotation cam 130 is adapted to prevent rotation of a cable restraint 100, the cam 130 includes a body having a through-hole adapted to be coupled to a fitting of the cable restraint 120, a first leg extending out from the body and adapted to prevent the cam from rotating in a clockwise direction, and a second leg extending out from the body and adapted to prevent the cam from rotating in a counter-clockwise direction. In another embodiment, an anti-rotation cable restraint 100 for connecting ducts includes a flexible cable 110, a first threaded end coupled to the cable along an axis of the cable, and a first anti-rotation cam coupled to the first threaded end perpendicular to the axis of the cable, the cam being adapted to prevent rotation of the cable and the threaded end when a nut is secured to the first threaded end.

As shown in FIG. 1, the anti-rotation cams 130 may be V-shaped pieces of metal (i.e., a triangular shape having two legs) that may be coupled to the threaded ends such that the cams rotate when the threaded end rotates. The cams 130 may be fashioned from a sheet of flat metal of an appropriate thickness (e.g., a thickness that is at least partly based on the stresses to be absorbed by the cams).

The cable 110 may be made of various materials (e.g., braided steel "rope" cables) and/or be formed in different lengths, as appropriate. The specific dimensions of the cable may be based at least partly on various factors such as the diameter, weight, operating tension, and/or flange characteristics of the ducts being connected. In addition, the intended use of the ducts may at least partly influence the dimensions of the cables. The ducts and duct flanges may include various materials, types, etc.

The threaded ends 120 may be any appropriate diameter and/or pitch. The diameter of the threaded ends may depend on various factors such as the size of any available through-holes in the flanges of the ducts being connected, the diameter of a securing nut used to couple each threaded end to a flange, etc. The pitch may depend on the type or pitch of the securing nut, and/or other appropriate factors. The securing nut attached to the threaded joint may be a lock nut (i.e., a nut that resists loosening under vibration and/or torque). The threaded ends may be attached to the cable in various appropriate ways (and/or may be formed in conjunction with the cable). For instance, the threaded ends may be swaged or welded to the cable, may be attached using adhesive, etc.

The anti-rotation cams 130 may be V-shaped pieces of metal of appropriate thickness, height, and width. The cams may be coupled to the threaded end 120. The cams may be attached to the threaded ends in various appropriate ways (e.g., welding the cams to the threaded ends, using a nut, forming the cams and threaded ends as a single casting or machined piece, using adhesive, etc.). The thickness, height, and/or width of the anti-rotation cams 130 may be at least partially based on various appropriate factors such as the diameter, size, and/or type of cables, the characteristics of the flanges, intended use, etc.

Although the anti-rotation cable restraints 100 have been described with reference to various specific features, one of ordinary skill in the art will recognize that the restraints may be configured in various different ways without departing from the spirit of the invention. For instance, although the restraints have been described as being formed of metal components, the restraints may also be made at least partly from various other appropriate materials (e.g., plastic, rubber, etc.) and in various appropriate ways (e.g., welded, bonded, formed, injection-molded, etc.). As another example, although the cams have been described as V-shaped, the cams may be made in various other appropriate shapes (e.g., oval, rectangular, etc.). The materials, manufacturing processes, and/or shapes used may depend on various appropriate factors associated with various particular applications.

Figure 2:
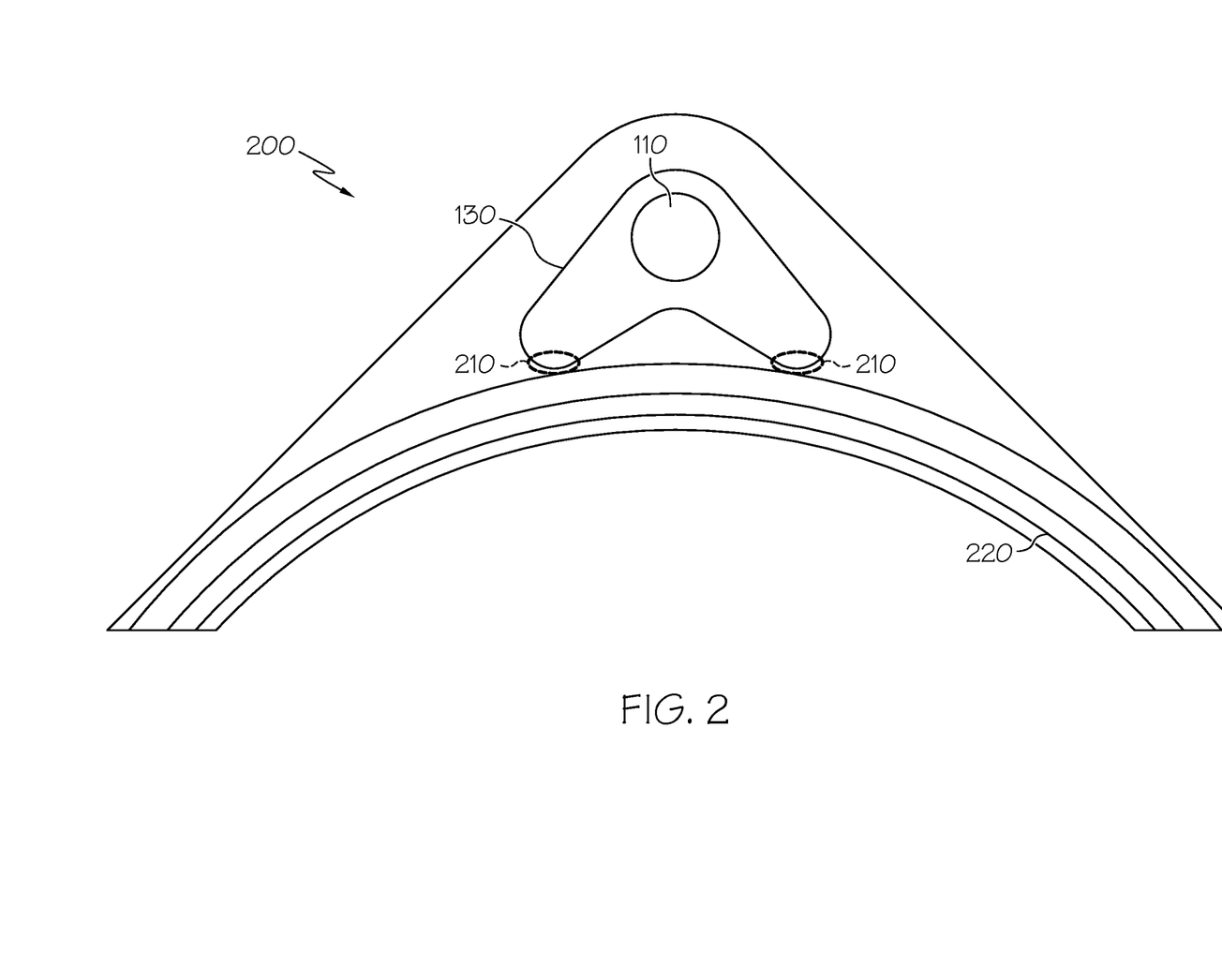
FIG. 2 illustrates a side view of the cable restraint of FIG. 1, specifically showing the anti-rotation cam.

FIG. 2 illustrates a side view 200 of the cable restraint of FIG. 1, specifically showing the anti-rotation cam 130. As shown: the anti-rotation cam (which is V-shaped in this example) includes two contact sections 210 which each prevent the cam from rotation in a particular direction (i.e., a first contact section may prevent the cam from rotating in a clockwise direction while a second contact section may prevent the cam from rotating in a counter-clockwise direction, or vice-versa) when coming in contact with a portion of a surface of the duct flange 220. Because the cam is coupled to the fitting 120 at a through-hole in the body of the cam, the cable is also prevented from rotating. The V-shaped cam provides a way to prevent rotation in both a clockwise and counter-clockwise direction, depending on which contact section is impeded by the flange.

The anti-rotation cam 130 may be configured in various appropriate ways to match various flanges. For instance, the height or width of the "V" may be varied such that appropriate mounting clearance is provided by the cable restraint (i.e., the "V" may be sized such that the cable restraint allows some rotational movement without contacting the cable flange). In this manner, the restraint may be aligned with an associated attachment point on the flange (e.g., the position of the restraint may be varied as the threaded end of the restraint is positioned within a through-hole in the flange, without having the cam come in contact with the surface of the duct flange) in a way that allows some flexibility in the position of the cables as they are attached or detached. In addition, the edges of the contact sections may be shaped in various appropriate ways (e.g., rounded at various diameters, angular, etc.).

Figure 3:
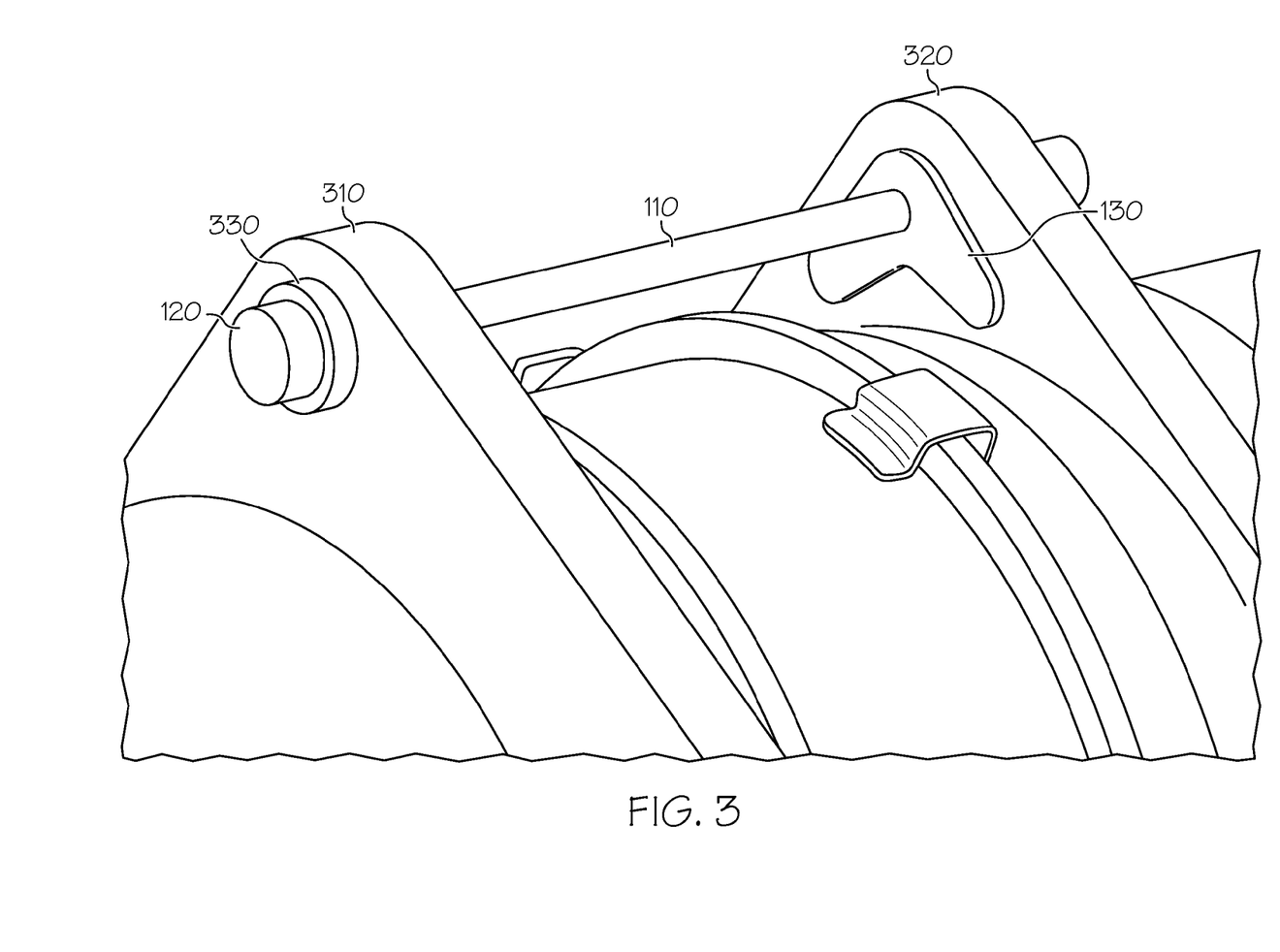
FIG. 3 illustrates a perspective view of the cable restraint of FIG. 1 during use.

FIG. 3 illustrates a perspective view of the cable restraint 100 of FIG. 1 during use. As shown, the cable restraint is coupled at a first end to a duct flange 310 of a first duct and coupled at a second end from a duct flange 320 of a second duct. The cable restraint is secured to the duct flange in this example with a nut 330 placed on the exterior side of the duct flange.

In another embodiment, a method of coupling a first flexible duct with a first flange to a second flexible duct with a second flange using an anti-rotation cable restraint includes: aligning the cable restraint with a through-hole of the first flange, securing the cable restraint to the first flange using a first lock nut, aligning the cable restraint with a through-hole of the second flange, and securing the cable restraint to the second flange using a second lock nut.

Different numbers and/or types of cable restraints may be used to secure various duct segments depending on various factors. For instance, the number of cable restraints used to connect ducts at one location may vary depending on the size of the ducts, the operating conditions of the ducts, the loads placed on the ducts, etc. In addition, a single connection may include different restraints (e.g., restraints of different physical dimensions, different material compositions, etc.), which may vary depending on the size of the ducts, the operating conditions of the ducts, the types of ducts, etc.

Figure 4:
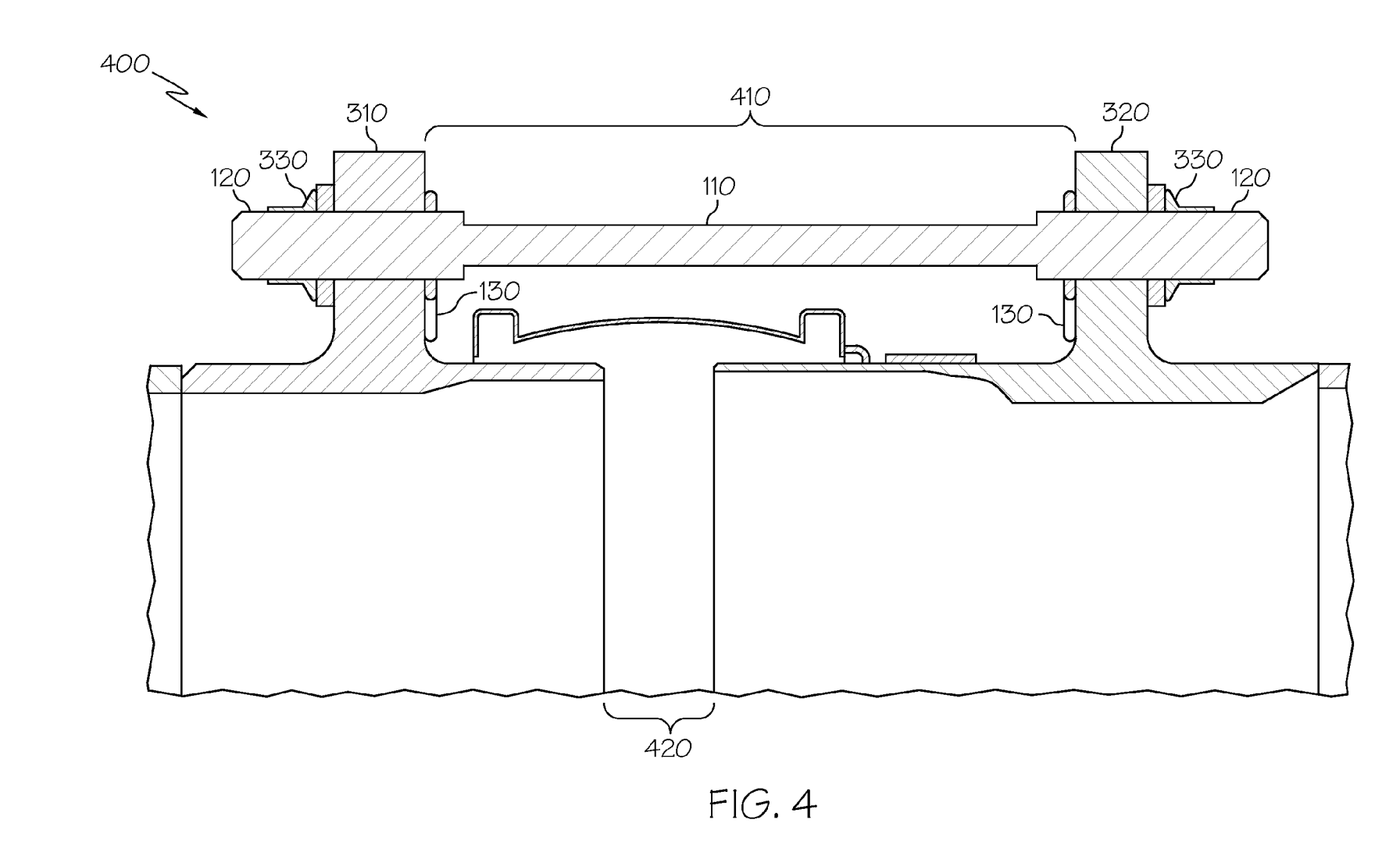
FIG. 4 illustrates a section view of the cable restraint of FIG. 1 during use, specifically highlighting the gap maintained by the cable restraint.

FIG. 4 illustrates a section view 400 of the cable restraint of FIG. 1 during use, specifically highlighting a gap 410 maintained by the cable restraint that corresponds to a desired (or "controlled") gap 420 between the flanges. The desired gap may be at least partly based on various appropriate factors (e.g., the types of duct, the types of flanges, the operating conditions of the connected ducts, etc.). Different cable restraints may be adapted to maintain different desired gaps, as appropriate. The desired gap may be any appropriate distance (e.g., a distance specified by the duct manufacturer and/or the flange manufacturer, distances calculated by a system designer, etc.) for the ducts being connected.

As shown in FIG. 4, the anti-rotation cams 130, each being coupled to each of the outer threaded fittings 120, which are each coupled to the cable 110 in this example; do not allow linear movement of the duct flanges 310-320 along the cable 110 (or linear movement of the ducts corresponding to the flanges). In this manner, the anti-rotation restraint 100 maintains the desired gap 420 between the ducts by maintaining a corresponding gap 410 between the flanges of the ducts.

Figure 5:
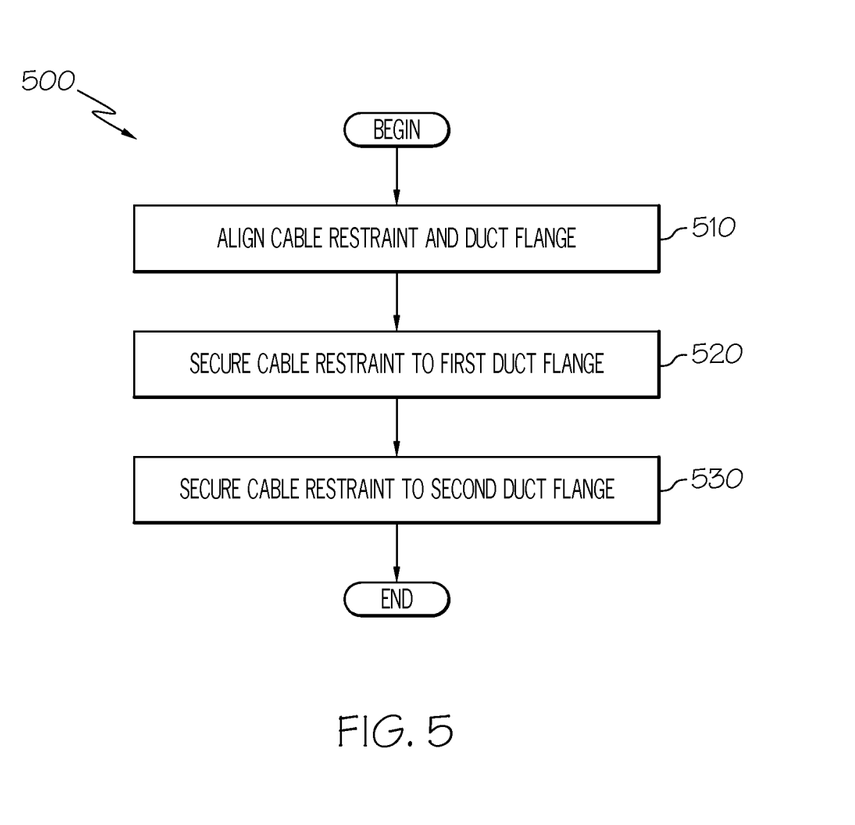
FIG. 5 illustrates a conceptual process 500 used in some embodiments when connecting or disconnecting a pair of ducts.

FIG. 5 illustrates a conceptual process 500 used in some possible embodiments when connecting or disconnecting a pair of ducts. Such ducts may include flanges 310-320 such as those described above in reference to FIG. 3. The process may begin when a pair of ducts is to be connected or disconnected. Next, when the ducts are to be connected, the cable restraint and duct flange may be aligned (at 510). When the ducts are to be disconnected, the restraint and duct will already be aligned, rendering such alignment unnecessary.

The process then secures (at 520) the cable restraint to a first duct flange. When the cables are to be disconnected, the cable restraint may instead be released from the first duct flange. As described above in reference to FIG. 2, when the cable restraint is secured or released, the anti-rotation cam may prevent the cable restraint from turning, allowing one-handed installation or removal of a securing nut coupled to a threaded end of the cable restraint.

Next, the process secures (at 530) the cable restraint to a second duct flange. When the cables are to be disconnected, the cable restraint may instead be released from the second duct flange. As above, when the cable restraint is secured or released, the anti-rotation cam prevents the cable restraint from turning, allowing one-handed installation or removal of a securing nut coupled to the other threaded end of the cable restraint.

Process 500 (or portions thereof) may be performed multiple times (e.g., when installing more than one cable restraint at a connection) and/or may be partially performed (e.g., when disconnecting the cable restraint(s) from one flange but not the other).

Figure 6:
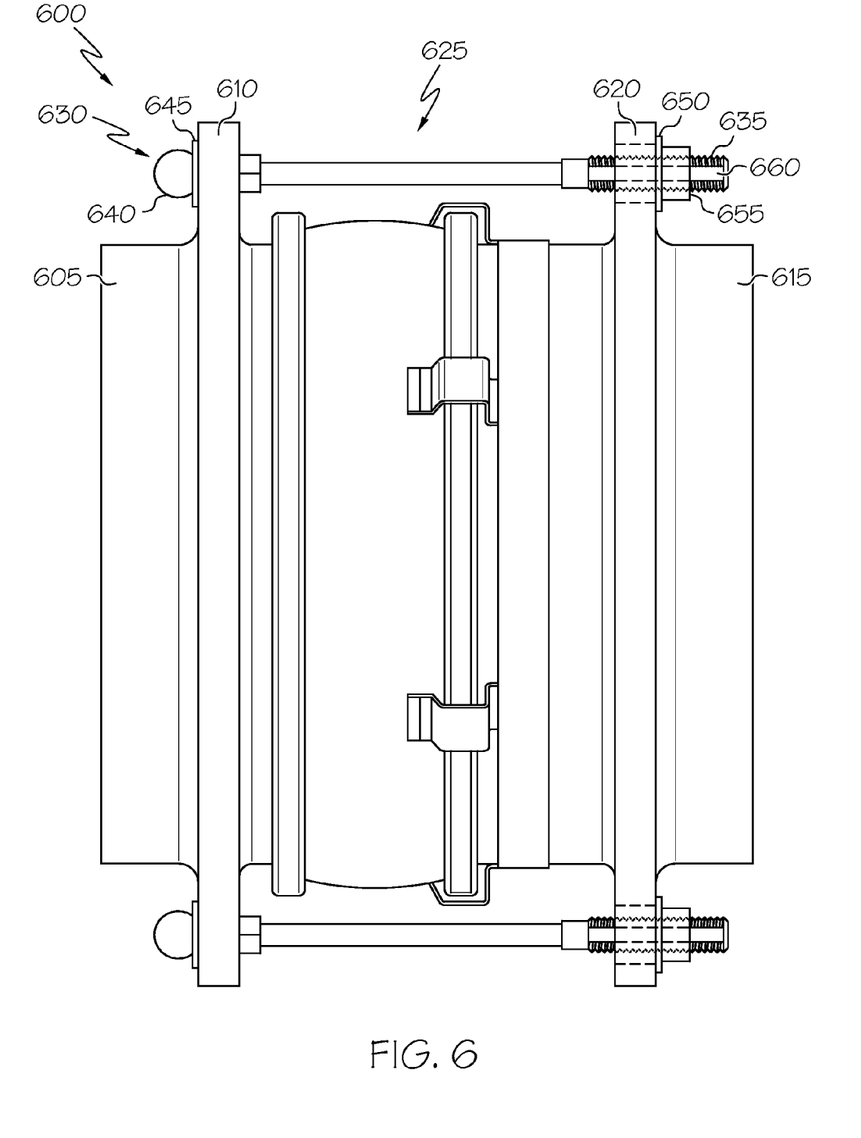
FIG. 6 illustrates a perspective view of an anti-rotation duct restraint according to an exemplary embodiment of the present invention.

FIG. 6 illustrates a perspective view of an embodiment of an anti-rotation duct restraint device 600 for connecting a first flexible duct 605 having a first flange 610 to a second flexible duct 615 having a second flange 620. Specifically, this figure shows the various components of the anti-rotation duct restraint 600, which includes a flexible cable 625 having a proximal unthreaded first end 630 that is coupled to the flexible cable 625 along an axis, and a distal threaded second end 635 that is also coupled to the flexible cable 625 along an axis. In some embodiments the flexible cable 625 may be made of braided steel. In some embodiments, one and/or two and/or three and/or four anti-rotation duct restraints 600 may be used to connect the first flexible duct 605 with the second flexible duct 615. In some embodiments a plurality of anti-rotation duct restraints 600 may comprise an anti-rotation duct restraint system for connecting plurality of flexible ducts.

As shown in FIG. 6, the unthreaded first end 630 may include a balled or swaged cable end 640, which may be used to secure the flexible cable 625 against the first flange 610. That is, the flexible cable 625 may be inserted through an optional washer 645 and the through-hole (not shown) in the first flange 610, such that the washer 645 fits between the swaged cable end 640 and the first flange 610. The through-hole in the first flange 610 may be of any size diameter so long as the structural integrities of the first flange 610 and first flexible duct 605 are maintained.

The threaded second end 635 may include one or more machined or flattened surfaces (not shown), which may be inserted into a mating metal bushing 650 having a matching configuration and is adapted to fit over the flattened threaded second end 635. In some embodiments the threaded second end 635 may include 1-10 flattened surfaces, or 1-6 flattened surfaces, or 1-4 flattened surfaces, or 1-3 flattened surfaces, or 2 flattened surfaces. Together, the mating metal bushing 650 and threaded second end 635 may be inserted into the through-hole (not shown) in the second flange 620 of the second flexible duct 615. The through-hole of the second flange 620 may also be of any size diameter, including about the same diameter size of the first flange 610 in the first flexible duct 605, so long as the structural integrity of the second flange 620 and second flexible duct 615 are maintained.

The threaded second end 635 may extend through the second flange 620 and be secured by a nut 655 to reversibly connect the first flexible duct 605 with the second flexible duct 615. As the nut 655 is tightened onto the threaded second end 635, the swaged cable end 640 comes to rest on the washer 645 and first flange 610, and the nut 655 on the threaded second end 635 is secured against the mating metal bushing 650 installed into the second flange 620, which prevents the rotation of the flexible cable 625 and the rotation of the first flexible duct 605 and the second flexible duct 615. This configuration requires using only one tool with one hand to tighten or loosen the nut 655. The mating parts, i.e. the mating metal bushing 650 and threaded second end 635, should be sufficiently robust in order to withstand multiple installation/removal cycles. In some embodiments, the nut 655 can be a locknut.

In some embodiments the length of the flexible cable 625 allows for a desired space and/or angle between the first flexible duct 605 and the second flexible duct 615. The space and/or angle may depend upon the size and types of ducts being connected. For example, in some embodiments the space between the first flexible duct 605 and the second flexible duct 615 may be from about 0 cm to about 2.5 cm, or from about 0.5 cm to about 2 cm, or from about 1.0 cm to about 1.5 cm; and the angle may be from about 0° to about ±5°, or from about ±1° to about ±4°, or from about ±2° to about ±3°, or about ±2.5°.

Figure 7:
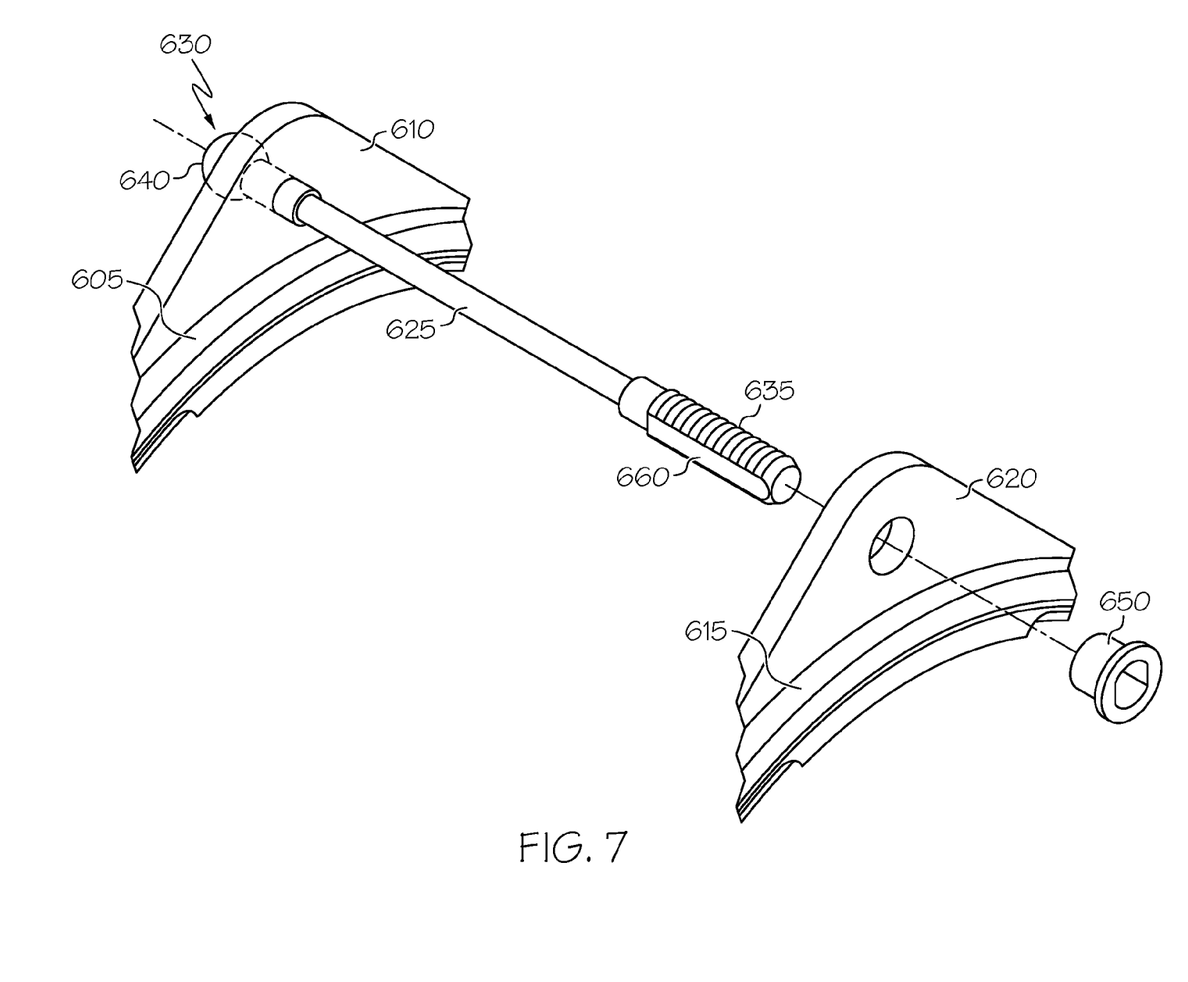
FIG. 7 illustrates a perspective view of the first and second flanges in the first and second ducts, respectively; the anti-rotation duct restraint cable having an unthreaded first end and a threaded second end with one or more flattened surfaces, and a mating metal bushing.

FIG. 7 illustrates a perspective view of the first duct 605 and first flange 610 and the second duct 615 and second flange 620. No increase in the size of the diameter of the through-hole is needed for the first flange 610, however, as described above, the diameter of the through-hole in the second flange may be optionally increased to accommodate the mating metal bushing 650. Also shown is the flexible cable 625, which has an unthreaded first end 630 with a swaged cable end 640, and a threaded second end 635 having one or more flattened surfaces 660, and the mating metal bushing 650.

Figure 8:
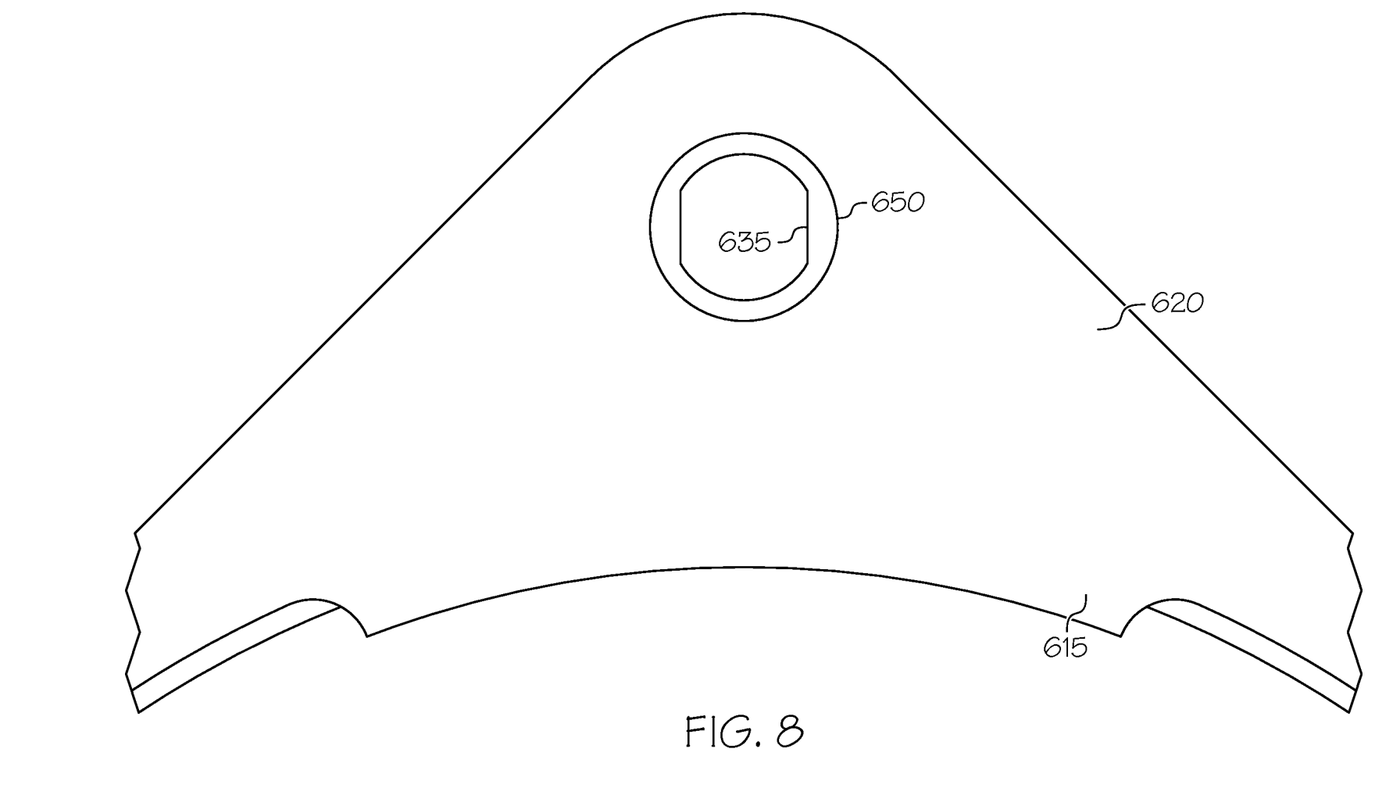
FIG. 8 illustrates an end-on perspective view of the second duct and second flange including the threaded second end of the flexible cable and mating metal bushing.

FIG. 8 illustrates an end-on perspective view of the second duct 615 and second flange 620 with the mating metal bushing 650 and threaded second end 635 of the flexible cable 625. As shown, the threaded second end 635 of the flexible cable 625 and mating metal bushing 650 are inserted into the through-hole of the second flange 620. The configuration prevents the rotation of the flexible cable 625 and the rotation of the first flexible duct 605 and the second flexible duct 605.

It should be understood, of course, that the foregoing relates to exemplary embodiments of the invention and that modifications may be made without departing from the spirit and scope of the invention as set forth in the following claims. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material. All references cited herein are herein incorporated by reference in their entireties.

We claim:

1. A method of connecting flexible ducts using an anti-rotation duct restraint system, comprising:
    preparing a flexible cable having a swaged cable end coupled to the cable along an axis of the cable, and a flattened threaded cable end coupled to the cable along the axis of the cable;
    aligning the swaged cable end with a through-hole in a first flange of a first flexible duct, and a washer, wherein the washer fits between the swaged cable end and the first flange of a first flexible duct;
    aligning the flattened threaded cable end and a mating metal bushing with a through-hole in a second flange of a second flexible duct, wherein the mating metal bushing is adapted to fit over flattened threaded cable end, and wherein the flattened threaded cable end and mating metal bushing, together, fit into the second flange of the second flexible duct; and
    securing the flattened threaded cable end to the second flange of the second flexible duct using a nut.

2. The method of claim 1, wherein the flexible cable comprises braided steel.

3. The method of claim 1, wherein the nut can be secured using a single tool with one hand.

4. The method of claim 1, wherein the nut is a lock nut.

5. The method of claim 1, wherein the length of the flexible cable allows for a desired space between the first flexible duct and the second flexible duct.

6. The method of claim 1, wherein the length of the flexible cable allows for a desired angle between the first flexible duct and the second flexible duct.

\* \* \* \* \*